United States Patent [19]

Lupinski

[11] Patent Number: 5,204,395
[45] Date of Patent: Apr. 20, 1993

[54] FLAME RETARDANT POLYPHENYLENE ETHER COMPOSITIONS

[75] Inventor: John H. Lupinski, Scotia, N.Y.

[73] Assignee: General Electric Company, Schenectady, N.Y.

[21] Appl. No.: 805,159

[22] Filed: Dec. 11, 1991

[51] Int. Cl.$^5$ .............................................. C08K 9/06
[52] U.S. Cl. ................................... 524/265; 523/210; 523/212; 524/267; 524/413; 524/405; 524/445; 524/425; 524/495; 524/496; 524/611
[58] Field of Search ............. 524/413, 425, 495, 496, 524/445, 405, 265, 267, 611; 523/210, 212

[56] References Cited

U.S. PATENT DOCUMENTS

| | | | |
|---|---|---|---|
| 3,862,082 | 1/1975 | Hatanaka et al. | 524/413 |
| 4,073,765 | 2/1978 | Katchman et al. | 524/413 |
| 4,147,707 | 4/1979 | Alewelt et al. | 524/611 |
| 4,293,478 | 10/1981 | Sugio et al. | 524/413 |
| 4,394,469 | 7/1983 | Stratta et al. | 523/212 |
| 4,446,090 | 5/1984 | Lovgren et al. | 524/264 |
| 4,525,508 | 6/1985 | Lee | 524/413 |
| 4,616,049 | 10/1986 | Thompson et al. | 523/212 |
| 4,645,787 | 2/1987 | Talley | 524/137 |
| 4,757,107 | 7/1988 | Yeager et al. | 524/435 |
| 4,863,984 | 9/1989 | Yeager et al. | 524/157 |

*Primary Examiner*—Veronica P. Hoke
*Attorney, Agent, or Firm*—William A. Teoli; Williah H. Pittman

[57] ABSTRACT

Flame retardant polyphenylene ether compositions are provided which utilize a silicone fluid treated filler, such as a clay or fumed titanium oxide treated with a polydiorganosiloxane fluid.

5 Claims, No Drawings

FLAME RETARDANT POLYPHENYLENE ETHER COMPOSITIONS

BACKGROUND OF THE INVENTION

The present invention relates to flame retardant polyphenylene ether compositions in the form of blends of polyphenylene ether and silicone treated fillers such as clay or fumed titanium dioxide treated with a polydiorganosiloxane fluid.

Prior to the present invention, as shown by Talley, U.S. Pat. No. 4,645,787, flame retardant polyphenylene ether compositions were prepared by utilizing an effective amount of an organothiophosphate, such as triphenylthiophosphate which is useful for imparting flame retardant properties. Yeager et al, U.S. Pat. No. 4,757,107, describe the use of an iron halide in a blend of polyphenylene ether and styrene to improve the flame retardancy of the blend. As shown by Yeager et al, U.S. Pat. No. 4,863,984, an extrudate of a polyphenylene ether blend can be made flame retardant by using an organo amine salt such as a dibutylamine salt.

It would be desirable, therefore, to provide additional polyphenylene ether compositions having improved flame retardant properties.

SUMMARY OF THE INVENTION

The present invention is based on the discovery that improved flame retardance can be imparted to polyphenylene ether compositions, including polyphenylene ether blends, by incorporating into the compositions, fillers such as clay and fumed titanium dioxide modified with a silicone fluid.

As used hereinafter, the term UL-94 $V_o$ flame retardancy means that the flame retardant polyphenylene ethers and blends have satisfied UL-94 $V_o$ requirements for flammability, as shown by the "Flammability of Plastic Materials Bulletin" of Jan. 24, 1980. More particularly, a $5''\times\frac{1}{2}''\times 1/16''$ polyphenylene ether test bar containing an effective amount as defined hereinafter, of the flame retardant, is suspended vertically over a $\frac{3}{4}''$ Bunsen Burner flame as provided in the aforementioned UL94 test. The test sample preferably exhibits a UL94 $V_o$ rating which includes the following criteria:

A. Not have any specimen which burn with flaming combustion for more than 10 seconds after application of the test flame.

B. Not have a total flaming combustion time exceeding 50 seconds for 10 flame applications for each set of five specimens.

C. Not have any specimens which burn with flaming or glowing combustion up to the holding clamp.

D. Not have any specimens which drip flaming particles that ignite dry absorbent surgical cotton located 12 inches (305 mm) below the test specimen.

E. Not have any specimens with glowing combustion which persists for more than 30 seconds after the second removal of the test flame.

In addition to satisfying the UL94 $V_o$ requirements, the flame retardant polycarbonate compositions also have been found to have satisfactory heat and smoke release rates when tested in accordance with ASTM-E906-83. The following test can be used:

Polymer plaques ($6''\times 6''\times 1/16''$) are mounted in the horizontal mode of the test chamber. The environmental test chamber contains a constant flow of air throughout the test. Combustion is initiated by a non-piloted ignition, piloted ignition of evolved gases, or by point ignition of the surface. If ignited by piloted ignition, the end of the burner tubing is 10 mm above and perpendicular to the exposed horizontal surface of the specimen. The changes in optical density of the gas leaving the chamber are monitored and from this data, smoke release rates are determined. The results for total smoke evolved and smoke release rates are reported in smoke/square meter of sample and smoke/min/square meter respectively. The "Smoke" unit is defined by the concentration of smoke particulates in a cubic meter of air that reduces the transmission of light through a 1 meter path to 10% as measured by a calibrated photometer.

Calculations: Smoke Release Rate = $D/kLA(V_o/t)$ where:

k absorption coefficient - 1.0 squared meter/smoke

D optical density (absorbance) = log (100%T)

L light path - 0.134 m (stack width)

A exposed surface area of specimen, squared meter $V_o/t$ flow rate of air leaving apparatus cubic meter/min = $V_i/t \times T_o/T_i$ $V_i/t$ flow rate of air entering apparatus, cubic meter/min $T_i, T_o$ absolute temperature of air in and out of apparatus respectively.

STATEMENT OF THE INVENTION

There is provided by the present invention, a flame retardant polyphenylene ether composition comprising from about 70% to about 99% by weight of polyphenylene ether and from about 1% to about 30% by weight of a polydiorganosiloxane fluid-filler blend which is incorporated into the polyphenylene ether as a free-flowing powder and provides from about 0.25% to about 4% by weight of polydiorganosiloxane fluid based on the weight of polyphenylene ether composition.

The polyphenylene ethers which can be utilized in the practice of the present invention include polyphenylene ethers comprising a plurality of structural units having the formula,

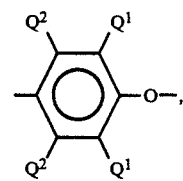

where in each of said units, independently, each $Q^1$ is halogen, primary or secondary lower alkyl (i.e., alkyl containing up to 7 carbon atoms), alkenyl, such as allyl, phenyl, haloalkyl, aminoalkyl, glycidyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-buty, isobutyl, n-amyl, isoamyl, 2-methylbutyl, n-hexyl, 2,3-dimethylbutyl, 2-,3- or 4-methylphentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6--trimethyl-1,4-phenylene ether units. Many suitable random copolymers, as well as homopolymers, are disclosed in the patent literature.

Particularly useful are poly(2,6-dimethyl-1,4-phenylene ethers). Suitable polymers generally have a number average molecular weight within the range of about 5,000–40,000 and weight average molecular weight within the range of about 20,000–80,000, as determined by gel permeation chromatography. Their intrinsic viscosities are preferably in the range of about 0.35–0.6 dl/g, as measured in chloroform at 25° C.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also know are cobalt-containing catalyst systems. Suitable manganese and cobalt-containing catalyst systems for polyphenylene ether preparation are known in the art by reason of disclosure in numerous patents and publications.

Silicone fluids which can be utilized in the practice of the present invention are polydiorganosiloxane fluids where the organo radicals are attached to silicon by carbon-silicon linkages and the fluids are preferably polydimethylsiloxane fluids or silicone fluids consisting essentially of chemically combined dimethylsiloxy units, with one or more siloxy units such as methoxymethylsiloxy, methylphenylsiloxy units and diphenylsiloxy units. The polydiorganosiloxane fluids can be chain terminated with triorganosiloxy units, such as trimethylsiloxy units, and can have a viscosity in the range of from about 50 centipose to 10,000 centipose at 25° C. The polydiorganosiloxane fluids can be made by standard hydrolysis procedures from chlorosilanes, such as dimethyldichlorosilane and trimethylchlorosilane, or by equilibration procedures involving the use of cyclic polydiorganosiloxanes such as octamethylcyclotetrasiloxane or hexamethylcyclotrisiloxane and chain stopping disiloxanes, such as hexamethyldisiloxane, and 1,3-divinyltetramethyldisiloxane using an equilibration catalyst, such as acid clay.

Fillers which can be utilized in the practice of the present invention as carriers for the silicone fluid preferably have a particle size in the range of from 10 nm to 10 μm and include calcined clays such as kaolin, and fumed titanium oxide which can be formed by burning titanium chloride in an oxygen containing atmosphere. The preferred fillers are clays, such as Satintone 5 or Translink 555 manufactured by the Engelhard Company, Edison, N.J. and fumed $TiO_2$ from the Degussa Co. In addition, other fillers such as calcium carbonate and carbon black can be used.

The filler can be treated with the polydiorganosiloxane fluid by mixing the polydiorganosiloxane fluid with the finely divided filler in a suitable container using a standard means of agitation, such as by stirring or mechanical mixing. The fluids can be diluted with various solvents e.g., toluene to facilitate mixing. After mixing, the solvent can be removed by evaporation. The amount of polydiorganosiloxane fluid used should not exceed an amount which would interfere with the formation of a free-flowing powder.

In order that those skilled in the art will be better able to practice the present invention the following examples are given by way of illustration and not by way of limitation. All parts are by weight.

EXAMPLE

A blend of 10 parts of Satintone 5, a clay from the Engelhard Company, and 2.5 parts of SF 96-50, a polydimethylsiloxane fluid having a viscosity of 50 centipoise at 25° C. was prepared by mixing the clay and the silicone fluid with a spatula until a homogeneous powder was obtained. An additional clay and silicone fluid blend was prepared following the same procedure utilizing 16 parts of the clay and 4 parts of the silicone fluid. Several additional blends were prepared including blends with fumed titanium dioxide and the silicone fluid.

Treated and untreated fillers and pelletized polyphenylene ether over a broad weight percent range were respectively blended and the respective blends melt extruded at a temperature of from 290° C. to 310° C. under a pressure of about 1500 psi to about 400° C. to produce 5"×½"×1/16" bars for UL-94 testing. The table below shows the UL-94 results which were obtained with a control and the various blends where PPE means polyphenylene ether, SAT 5 means Satintone 5, Trans 55 means Translink 555, $TiO_2$ means fumed $TiO_2$, silicone means the SF 96-50 fluid, FOT means flame out time and the numerical values are in % by weight:

| PPE | SAT 5 | TRANS 55 | $TiO_2$ | Silicone | UL-94 | FOT (sec) |
|---|---|---|---|---|---|---|
| 100 | | | | | $V_1$ | |
| 90 | 10 | | | | $V_1$ | 5.60 |
| 84 | 16 | | | | $V_1$ | 7.77 |
| 93.8 | | | 6.2 | | $V_1$ | 8.76 |
| 99 | .75 | | | .25 | $V_0$ | 3.13 |
| 98 | 1.5 | | | .5 | $V_1$ | 4.24 |
| 96 | 3 | | | 1 | $V_1$ | 3.24 |
| 92 | 6 | | | 2 | $V_0$ | 2.92 |
| 90 | 8 | | | 2 | $V_0$ | 2.21 |
| 88 | 9 | | | 3 | $V_0$ | 2.32 |
| 87.5 | 10 | | | 2.5 | $V_0$ | 2.31 |
| 80 | 16 | | | 4 | $V_0$ | 2.97 |
| 99 | | .75 | | .25 | $V_0$ | 2.85 |
| 98 | | 1.5 | | .5 | $V_0$ | 1.97 |
| 96 | | 3 | | 1 | $V_1$ | 2.84 |
| 92 | | 6 | | 2 | $V_0$ | 3.06 |
| 88 | | 9 | | 3 | $V_0$ | 2.57 |
| 92.5 | | | 6 | 1.5 | $V_0$ | 2.50 |
| 87.5 | | | 10 | 2.5 | $V_0$ | 1.69 |

The above $V_1$ and $V_0$ results show that although untreated filler can have a beneficial affect on the flammability of polyphenylene ether, a definite enhancement in UL-94 properties are obtained with blends having silicone modified fillers. Although $V_1$ ratings also are shown for blends having both treated and untreated filler, the treated filler blends had significantly lower flame out time (FOT).

Although the above example is directed to only a few of the very many variables which can be employed in the practice of the present invention, it should be understood that the present invention is directed to use of a much broader variety of polyphenylene ether, silicone fluids and fillers as set forth in the description preceding this example.

What is claimed is:

1. A flame retardant polyphenylene ether composition comprising from about 70% to about 99% by weight of polyphenylene ether and from about 1% to about 30% by weight of a polydiorganosiloxane fluid-filler blend which is incorporated into the polyphenylene ether as a free-flowing powder which provides from about 0.25% to about 4% by weight of the polydiorganosiloxane fluid based on the weight of polyphenylene ether composition.

2. A flame retardant polyphenylene ether composition in accordance with claim 1, where the filler is clay.

3. A flame retardant polyphenylene ether composition in accordance with claim 1, where the filler is fumed titanium oxide.

4. A flame retardant polyphenylene ether composition in accordance with claim 1, where the polydiorganosiloxane fluid is a polydimethylsiloxane fluid.

5. A flame retardant blend in accordance with claim 1, where the polyphenylene ether is the oxidative coupling product of 2,6-xylenol.

* * * * *